No. 803,517. PATENTED OCT. 31, 1905.
J. Q. ADAMS, C. F. SMITH & S. K. DAVIDSON.
FILTER.
APPLICATION FILED JUNE 8, 1904.
4 SHEETS—SHEET 3.
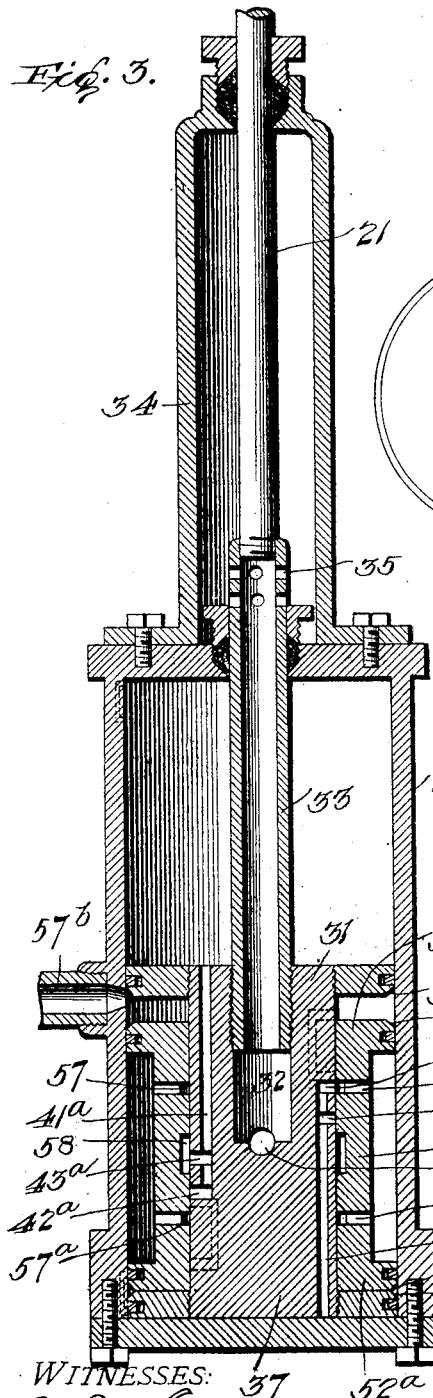
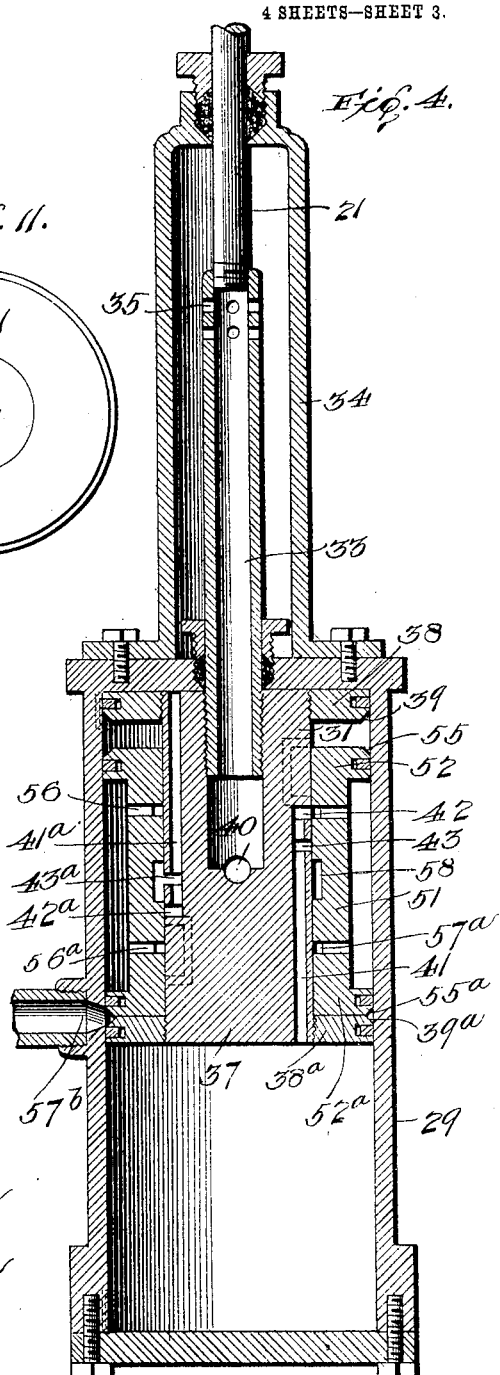
WITNESSES:
INVENTORS:
SIDNEY K. DAVIDSON
JOHN Q. ADAMS
CHARLEY F. SMITH
BY
Attorneys

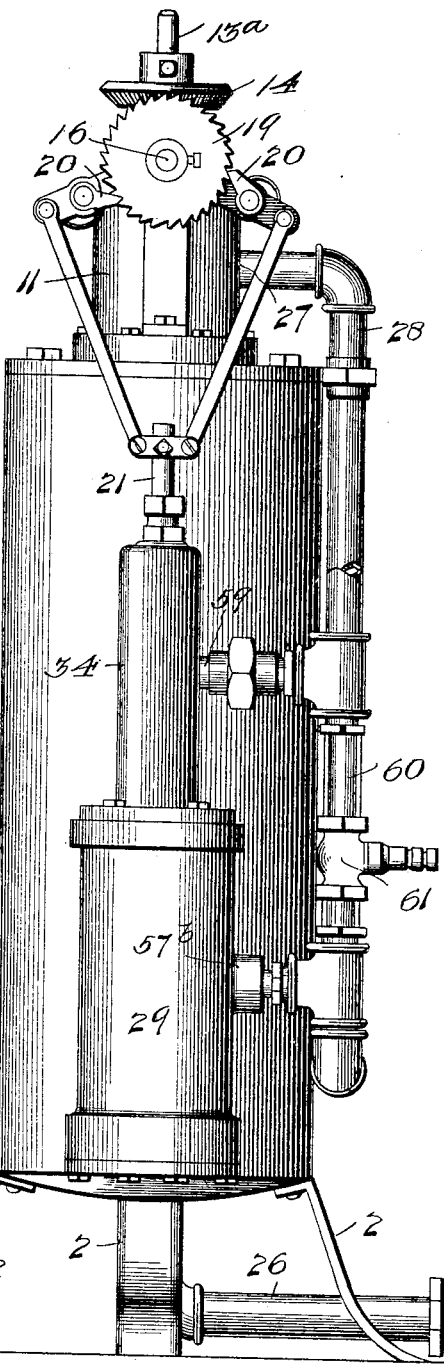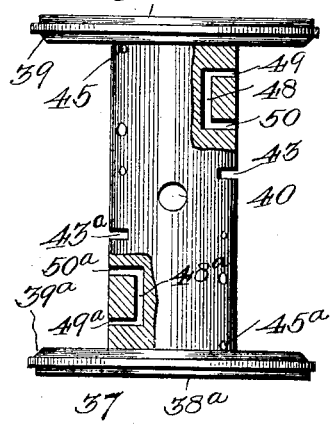

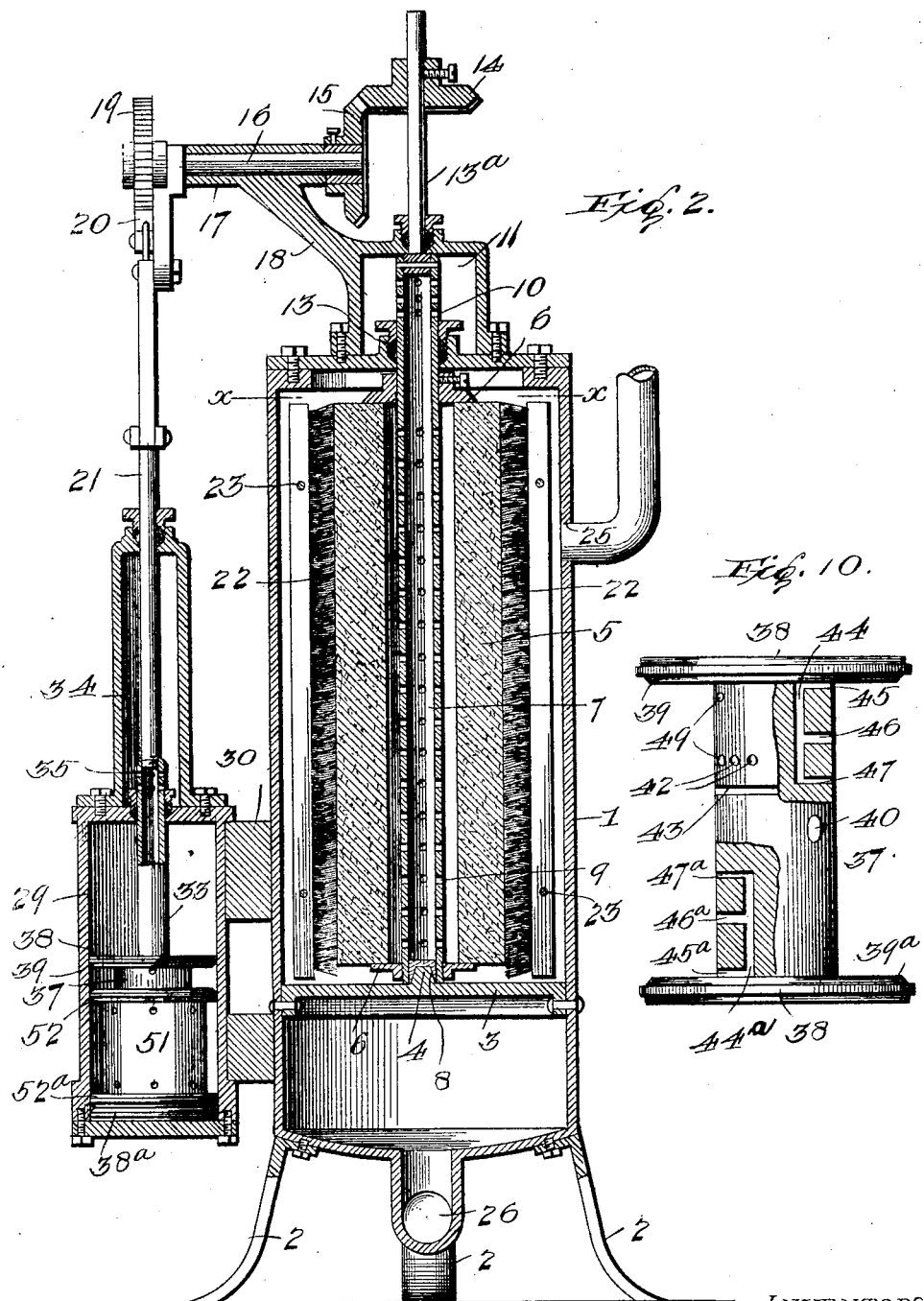

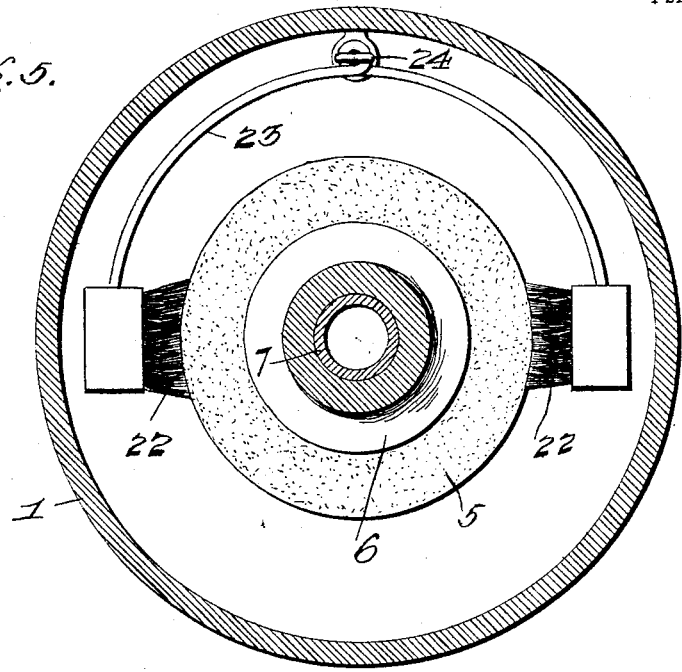
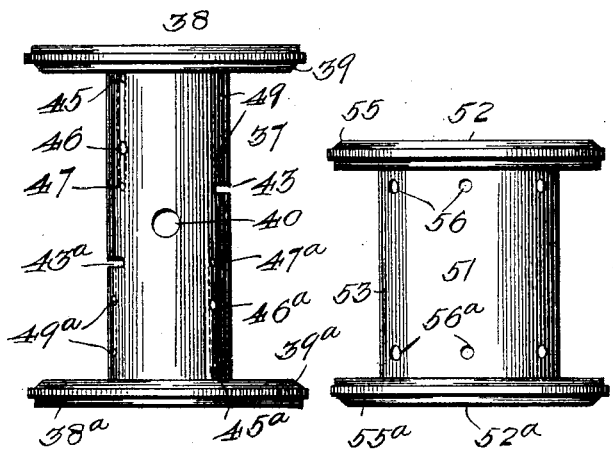
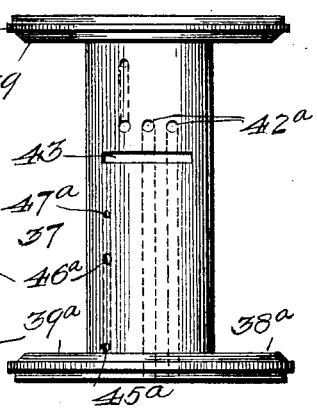

UNITED STATES PATENT OFFICE.

JOHN Q. ADAMS, CHARLES F. SMITH, AND SIDNEY K. DAVIDSON, OF HICKMAN, KENTUCKY; SAID SMITH ASSIGNOR TO SAID DAVIDSON.

FILTER.

No. 803,517.

Specification of Letters Patent.

Patented Oct. 31, 1905.

Application filed June 8, 1904. Serial No. 211,692.

*To all whom it may concern:*

Be it known that we, JOHN Q. ADAMS, CHARLES F. SMITH, and SIDNEY K. DAVIDSON, citizens of the United States, residing at Hickman, in the county of Fulton and State of Kentucky, have invented certain new and useful Improvements in Filters; and we do hereby declare the following to be a full, clear, and exact description of the invention, such as will enable others skilled in the art to which it appertains to make and use the same.

Our invention relates to improvements in filters.

In all porous-stone filters a layer of mud or other foreign matter will accumulate on the side of the stone from which the water enters. It is therefore necessary to provide some means for removing this accumulation, else it will form a coating sufficient to prevent the water from passing through the filtering medium. The more frequently the filter is cleansed the more rapidly will water pass through the filtering medium.

The object of our invention is to provide a power device for cleaning the filtering medium while water is being filtered and which is operated by filtered water, so that there is no water wasted and there is no sand or foreign matter in the water passing through said power device to cause unnecessary wear thereon, and whose operation will be started by the opening of any cock in the service-pipes.

The power device may be operated by either filtered or unfiltered water without change in construction; but filtered water is preferable, as it lessens the wear on the mechanism.

To this end our invention consists of a filtering-machine comprising a preferably cylindric stone or other filtering medium mounted to revolve in a suitable receptacle, means secured within said receptacle and contacting with the surface of said stone to cleanse the same, a water-motor to revolve said stone or other filtering medium, and means for conveying the filtered water from within said filter to said motor to operate the latter.

In the accompanying drawings, illustrating our invention, Figure 1 is a front elevation of a filtering device embodying our invention. Fig. 2 is a central sectional view thereof. Fig. 3 is an enlarged sectional view taken through the motor cylinder and piston. Fig. 4 is a similar view showing the arrangement of the piston at the end of its upward stroke. Fig. 5 is a cross-sectional view taken on the line *x x* of Fig. 2, showing the arrangement of the brushes. Fig. 6 is an elevation of the motor-piston valve with the sliding valve removed. Fig. 7 is an elevation of the motor-piston valve removed from the piston. Fig. 8 is another elevation of the motor-piston looking at it from a position ninety degrees to the right of that from which Fig. 6 is taken. Figs. 9 and 10 are elevations of the motor-piston, partly in central section, disclosing certain of the passages therein; and Fig. 11 is an end view of the piston.

Referring more particularly to the drawings, in carrying out our invention we provide a preferably upright cylindric receptacle 1, preferably raised upon suitable supports or legs 2 and provided with a cross-bar or other suitable support 3, arranged a short distance from the bottom and having a centrally-arranged upwardly-projecting pin or stud 4. Supported and adapted to revolve upon said pin the cylindric filtering medium 5 is mounted between oppositely-applied end-clamping plates or disks 6, which may be screw-threaded or connected in any other suitable manner to a central perforated pipe or tube 7. Said tube is suitably plugged at its lower end, in which is provided a socket 8 to receive the stud 4. Said tube is provided with two sets of perforations—a lower set 9, arranged in that portion of the tube within the filtering medium, and an upper set 10, arranged in the upper end of said tube and opening into a chamber 11, arranged above the receptacle 1, the passage into which is suitably packed, as at 13, around the tube 7. A shaft 13$^a$ is connected to the upper extremity of said tube and passes through a suitable stuffing-box in the top of the chamber 11, where it carries a beveled pinion 14, meshing with a second pinion 15, mounted on a shaft 16, journaled in a sleeve 17, supported by an arm 18, preferably cast integral with the casing of the chamber 11. The other end of the shaft 16 carries a ratchet-wheel 19 and oppositely-acting ratchet-teeth 20, adapted to operate said wheel on both strokes of the piston-rod 21 of the motor presently described.

Upright brushes 22 are arranged on opposite sides of the filtering medium within the receptacle 1. Said brushes extend the whole length of the filtering medium and are mounted on springs 23, preferably two in number and generally semicircular in shape, one connected near each end of the brushes to lugs on the interior of said receptacle by a pin 24 passing through eyes in said lugs and the central portions of said springs. Said springs, as shown, are made of brass spring-wire and bent around at the center to form the eyes; but it is obvious that plate-springs with eyes drilled therein may be used, if desired. The object of the springs is to hold the brushes in contact with the filtering medium to clean the latter as it revolves. The receptacle is provided with an inlet-port 25 in its side and a mud-valve 26 at the bottom, which may be connected to a waste-pipe or sewer. The chamber 11 has a port 27, from which a pipe 28 connects with the motor-cylinder. Said motor-cylinder 29 is suitably connected to the receptacle, as by brackets 30. The piston 31 has a central bore 32, in one end of which is screwed a tube 33, passing up through the head of the cylinder into a chamber 34, where it is provided with perforations 35. Above these perforations the tube is connected to the piston-rod 21, which extends upward to operate the ratchet already described. The entrances for said rod and tube to the chamber and cylinder, respectively, are suitably packed, as shown. The piston proper comprises a cylindric portion 37, carrying projecting heads 38 38$^a$, each provided with packing-rings around its edges and having its inner edges beveled, as at 39 39$^a$. Said piston is drilled with a central cross-aperture 40, extending all the way through it and communicating with the bore 32. Longitudinal passages 41 41$^a$ are drilled from opposite ends and on opposite sides of the piston and extend about three-fourths of the distance to the opposite ends, where they are tapped by horizontal passages 42 42$^a$ and slots 43 43$^a$, the latter arranged nearer the center of said piston. Other longitudinal passages 44 44$^a$ are formed at either end of the piston and have their outer openings plugged, but are tapped by horizontal passages 45 45$^a$ 46 46$^a$ 47 47$^a$, the first-mentioned of these passages arranged at either end immediately adjoining the heads 38 38$^a$, the second-mentioned passages 46 46$^a$ arranged about one-fourth the distance from their respective ends in the horizontal plane with the passages 42 42$^a$, and the passages 47 47$^a$ arranged still nearer the center of the piston. Still other U-shaped passages 48 48$^a$ are arranged on opposite sides of the piston and have their outer openings 49 49$^a$ a short distance from the heads and their more central openings 50 50$^a$ in alinement with the ports 42 42$^a$, respectively.

A sliding valve 51 is mounted around the piston between its heads and itself is provided with heads 52 52$^a$ at opposite ends of its reduced tubular body portion 53. The heads of the valve are provided with packing-rings and have their outer edges beveled, as at 55 55$^a$. The two series of passages—an upper one, 56, and a lower one, 56$^a$—are drilled through the reduced portion of the valve and open into annular grooves 57 57$^a$, which are so arranged that when the valve is down, as shown in Fig. 3, the upper groove 57 will be in alinement with the port 42, communicating with the longitudinal passage 41. The lower groove 57$^a$ bears the same relation to the port 42$^a$ when the valve is up. The ports 46 and 50 being in alinement with the passages 42 permit the passage of the water around the groove 57 into the port 42 when the valve is down, and the same is true of the ports 46$^a$ 50$^a$ 42$^a$ and groove 57$^a$ when the valve is up. Said valve is also provided with a broad central annular groove 58, which is of such width that it is always in communication with the exhaust-ports 40, leading to the tube 33, alternately communicates with the slots 43 43$^a$, and covers the corresponding ports 42 42$^a$, leading to their respective passages 41 41$^a$, opening at the ends of the piston. When the valve is down, as shown in Fig. 3, the exhaust-slot 43$^a$ is in alinement with the central groove, while its corresponding exhaust-slot 43 on the other side is closed; but the ports 42$^a$ communicate with the upper groove 57. When the valve is up, the relations of these parts are reversed. The water-inlet 57$^b$ to the cylinder is arranged midway of its sides and is preferably oblong, with its long diameter running with the circumference of the cylinder, so that the water will enter between the beveled edges of the adjacent heads of the piston and valve.

The operation of the device is as follows: The water enters the receptacle 1 by the inlet-port 25, passes through the filtering medium, through the perforated pipe 7, into the chamber 11. The filtered water passes from this chamber through suitable piping to the inlet-port 57$^b$ and is discharged between the beveled edges of the adjacent heads of the cylinder and piston, forcing the valve away from that head of the piston. In Fig. 3 the piston and valve are shown in this position. The water having forced the valve down enters the ports 45 and 49, passes through the passages 44 and 48, and enters the groove 57 through ports 46 and 50. It thence passes around said grooves and through the ports 42 into the passages 41 and is discharged against the lower end of the cylinder, forcing said piston upward. As soon as the upper head 52 of the valve passes the inlet-port 57$^b$ the water will enter the groove 57 through the ports or passages 56, adding to the velocity of the piston, which will continue its upward stroke until it is nearing the upper end of the cylinder and occupies the position shown in Fig. 4. The water then entering between the beveled edges of the lower heads of the piston and valve will force said valve upward, opening the ports 45$^a$ and 49$^a$, into which the water will pass through the passages 44$^a$ and 48ᵃ, be delivered into the groove 57ᵃ, pass around said groove and into the passage 41ᵃ, through the port 42ᵃ, and thence against the top of the cylinder, causing the downward stroke of the piston. As the piston moves upward in the first instance the water occupying the upper portion of the cylinder and which has been used to force said piston down passes through the passage 41ᵃ, through the exhaust-slot 43ᵃ, which is then in alinement with the central groove 58, into said groove, around said groove and into the passage 40 to the tube 33, and is emptied into the chamber 34, from which the service-pipe 59 leads. Thus it will be seen that each passage 41 and 41ᵃ acts alternately as an exhaust, while the other is used to convey the water to actuate the piston. As the valve is reversed the water between the adjacent heads of the piston and valve, which would otherwise act as a cushion, escapes through the ports 45 or 45ᵃ, as the case may be, into their respective passages 44 or 44ᵃ and out through the most centrally-arranged ports 47 or 47ᵃ into the central groove and thence to the chamber 34. It will be noted that the ports 46 and 46ᵃ are alternately exposed, as are also the ports 47 and 47ᵃ, to accomplish the above end. If the water-pressure is greater than is necessary to operate the motor, a by-pass pipe 60 may be employed and controlled by a pressure-valve 61, which may be regulated so as to allow the required pressure of water to operate said motor to pass into the same; but any above that amount will open the valve and be discharged through the by-pass pipe into the service-pipe from the chamber 34. It will be noted that whenever a cock in the service-pipe is opened, thus leaving an outlet for the water in the chamber 33, the pressure of the water will cause said water to begin to circulate through the machine. Entering the inlet-port of the filter-receptacle the water will force that ahead of it forward, so that it will operate the motor and immediately commence the cleaning operation and will keep it up until the cock is closed, cutting off the escape of the water.

We are aware that changes may be made in our invention without departing from the spirit or sacrificing the advantages thereof. We therefore reserve the right to make such changes as fairly fall within the scope of our invention.

Having thus described our invention, what we claim as new, and desire to secure by Letters Patent, is—

1. A device of the character described having means to filter the water, a motor, and means for operating said motor the energy of which is adapted to clean the filter, whereby the water is filtered and the filter cleaned automatically by drawing off the filtered water.

2. A device of the character described having means to filter the water, a motor, and means for operating said motor by the energy of the filtered water, whereby the water is filtered and the filter cleaned automatically by drawing off the filtered water.

3. In a device of the character described, a filter-receptacle, means for cleaning the filtering medium, a motor adapted to be operated by the filtered water from said filter automatically by the drawing off of the filtered water, said motor adapted to operate said means for cleaning the filtering medium.

4. In a device of the character described, a filter-receptacle, a filtering medium in said receptacle, means arranged longitudinally of said medium and adapted to contact with its surface, a motor adapted to be operated by the filtered water and itself revolve said stone medium automatically by the drawing off of the filtered water.

5. In a device of the character described, a filter-receptacle, a filtering medium arranged longitudinally of said receptacle, means arranged longitudinally of said medium and adapted to contact with its surface, a motor adapted to be operated by the filtered water and itself revolve said medium automatically by drawing off of the filtered water.

6. In a device of the character described, a filter-receptacle, a filtering medium in said receptacle, means for cleaning said filtering medium, a chamber arranged without said receptacle, means for conveying filtered water from the receptacle to said chamber, a motor adapted to operate said means for cleaning the filtering medium, and means for conveying filtered water from said chamber to said motor, whereby the motor is actuated to clean the filtering medium and water is filtered automatically by drawing off the filtered water.

7. In a device of the character described, a filter-receptacle, a tubular filtering medium revolubly mounted in said receptacle, means arranged longitudinally of said medium and adapted to contact with its surface, a chamber arranged without said receptacle, a perforated pipe extending from within the filtering medium into said chamber, whereby filtered water is conveyed to said chamber, a shaft extension on said pipe extending through said chamber, a motor, means to convey filtered water from said chamber to the motor for operating the latter, and means of connection between said motor and said shaft extension whereby the motor is actuated to revolve and clean the filtering medium and water is filtered automatically by drawing off the filtered water.

In testimony whereof we affix our signatures in presence of two witnesses.

JOHN Q. ADAMS.
CHAS. F. SMITH.
SIDNEY K. DAVIDSON.

Witnesses:
  HENRY N. COWGILL,
  JNO. HASKINS.